United States Patent [19]
Nakamura et al.

[11] Patent Number: 5,149,308
[45] Date of Patent: Sep. 22, 1992

[54] TRANSMISSION

[75] Inventors: Norimi Nakamura; Tadao Adachi; Akio Matsui; Kouji Fujiwara; Mitsugu Kobayashi; Tetsuo Yamaguchi; Minoru Fukuda, all of Sakai, Japan

[73] Assignee: Kubota, Ltd., Osaka, Japan

[21] Appl. No.: 841,306

[22] Filed: Feb. 28, 1992

Related U.S. Application Data

[63] Continuation of Ser. No. 359,908, Jun. 1, 1989, abandoned.

[30] Foreign Application Priority Data

Aug. 22, 1988 [JP] Japan .................. 63-208546
Aug. 22, 1988 [JP] Japan .................. 63-208547

[51] Int. Cl.⁵ ........................................ F16H 37/08
[52] U.S. Cl. ..................... 475/203; 475/206; 74/363; 74/371; 192/21; 192/51
[58] Field of Search ............... 74/378, 362, 363, 371; 192/21, 51; 475/160, 200, 203, 206

[56] References Cited

U.S. PATENT DOCUMENTS

| | | | |
|---|---|---|---|
| 3,095,759 | 7/1963 | Herrod | 74/701 |
| 3,623,583 | 11/1971 | Shimanckas | 192/51 |
| 3,812,735 | 5/1974 | von Kaler et al. | 74/371 |
| 3,818,855 | 6/1974 | Shimanckas | 192/51 X |
| 3,977,503 | 8/1976 | Hurst | 192/21 |
| 4,049,102 | 9/1977 | Hurst | 192/51 X |
| 4,103,566 | 8/1978 | von Kaler et al. | 74/701 |
| 4,150,590 | 4/1979 | Hurst | 192/21 X |
| 4,189,038 | 2/1980 | Hurst | 192/21 |
| 4,224,839 | 9/1980 | von Kaler | 74/701 |
| 4,523,493 | 6/1985 | Weiss | 74/700 X |
| 4,527,441 | 7/1985 | Nakahama | 74/378 |
| 4,615,240 | 10/1986 | Weiss | 74/701 X |
| 4,651,592 | 3/1987 | Edwards | 74/705 X |
| 4,662,241 | 5/1987 | Edwards | 74/701 |
| 4,673,055 | 6/1987 | Yamaoka et al. | 74/701 X |
| 4,702,119 | 10/1987 | Edwards | 74/701 X |
| 4,809,560 | 3/1989 | Nemoto | 74/701 X |
| 4,820,210 | 4/1989 | Dretzka | 192/51 X |

FOREIGN PATENT DOCUMENTS

| | | |
|---|---|---|
| 23323 | 7/1962 | German Democratic Rep. ... 74/378 |
| 63-46955 | 2/1988 | Japan . |
| 63-84450 | 6/1988 | Japan . |

Primary Examiner—Richard Lorence
Assistant Examiner—Benjamin Levi
Attorney, Agent, or Firm—Edwin E. Greigg; Ronald E. Greigg

[57] ABSTRACT

A transmission comprising a change speed mechanism and a differential housed in a transmission case. The change speed mechanism includes drive gears mounted on a transmission shaft, and driven gears meshed with drive gears. The differential includes a differential case having elongated axle-bearing bosses extending to inside walls of the transmission case. The driven gears are mounted on one of the elongated bosses to be rotatable therewith. The differential case is supported by rear wheel axles extending through the transmission case and the elongated bosses.

9 Claims, 7 Drawing Sheets

TRANSMISSION

This is a continuation of copending application Ser. No. 07/359,908 filed on Jun. 1, 1989, now abandoned.

BACKGROUND OF THE INVENTION (1) Field of the Invention

The present invention relates to a transmission for use in a lawn mower or an agricultural tractor to provide plural backward and forward speeds.

(2) Description of the Prior Art

In a known transmission, a differential case is attached through bearings to mounting bosses defined on inside walls of a transmission case (see Japanese Patent Publication Kokai No. 63-46955 for example).

Further, a disk type stepless transmission is known, which is capable of backward and forward drive switching and of providing a plurality of speeds in either of the backward and forward drive states (see Japanese Patent Publication Kokai No. 63-84450 for example).

In the former, the transmission case must include the mounting bosses on inside walls thereof for attaching the differential case. These additions render the transmission case complicated, and adds to difficulties in the manufacture thereof and in the arrangement of its components.

The latter has the advantage of enabling backward and forward drive switching and stepless change speed in either of the backward and forward drive states, which are effected by a single stepless change speed device. In practice, however, a large drive disk and a large driven disk are required to avoid a drastic reduction in the transmission efficiency. The whole construction is thus inevitably large despite the feature that the single change speed device is used for both the backward and forward drive switching and the change speed. Even though the disks are enlarged to improve the transmission efficiency, this stepless transmission, because its drive transmission is effected by a pressure contact between the drive and driven disks, cannot provide a higher transmission efficiency than a gear type transmission.

SUMMARY OF THE INVENTION

An object of the present invention, therefore, is to simplify the transmission case by slightly modifying the differential case.

Another object of the invention is to provide a compact transmission having a high transmission efficiency and capable of backward and forward drive switching and of providing a plurality of speeds in either of the backward and forward drive states.

The above objects are achieved, according to the present invention, by a transmission comprising a transmission case; a change speed mechanism housed in the transmission case; and a differential mechanism for transmitting drive from the change speed mechanism to ground wheels, the differential mechanism including an input section for receiving the drive from the change speed mechanism, the input section including a differential case, differential gear means for receiving the drive from the input section, and an output section for outputting the drive to the ground wheels, the output section including axles journaled in bosses defined by the transmission case; wherein the differential case has elongated bosses extending to inside walls of the bosses defined by the transmission case, the axles extending into the elongated bosses to support the differential case.

In the above construction, the differential case is supported by the transmission case through the axles. The transmission case, therefore, does not need to include brackets or bearings for supporting the differential case.

If the differential case with the known construction, i.e. with short bosses for receiving the axles, were supported by the transmission case only through the right and left axles, the differential case would whirl to a great extent owing to flexion of the axles. The differential case provided by the present invention has elongated bosses extending to the inside walls of the transmission case. This assures close contact between the axles and bosses. Extreme ends of the bosses contact the inside walls of the transmission case when the axles begin to flex, thereby restricting the flexion of the axles and checking the whirling of the differential case.

Consequently, the transmission case has a simplified construction without the need to support the differential case directly. Less consideration may be made in designing the differential case and transmission case in relation to each other.

Not only is the transmission case simplified, but the differential case may be supported as rigidly as when directly supported by the transmission case. The only modification required for these purposes consists in the extension of the axle-receiving bosses to the inside walls of the transmission case.

Preferably, one of the elongate bosses carries a plurality of gears mounted for rotation with the differential case to provide a plurality of speeds. This construction effectively utilizes a vacant space around one of the bosses, and dispenses with the need for the differential case to include a special input gear mount.

In a preferred embodiment of the invention, the change speed mechanism housed in the transmission case includes (1) a transmission shaft driven by a drive input shaft, the transmission shaft being connected to the drive input shaft through a pair of forward drive and backward drive input bevel gears to be selectively driven in opposite directions, and (2) a transmission gearing for transmitting drive to right and left axles extending parallel to the transmission shaft, the transmission gearing including a plurality of drive gears supported by the transmission shaft in parallel to the input bevel gears, and a plurality of driven gears meshed with the drive gears. The output section for outputting the drive to the ground wheels includes the axles journaled in bosses defined by the transmission case. The driven gears are relatively rotatably supported by one of the axles.

In the above construction, the backward and forward drive switching is effected by operating a clutch to select one of the input bevel gears for operative connection with the input shaft. The drive is thus transmitted to the transmission shaft, and is changed to high speed or low speed by the transmission gearing for transmission to the differential mechanism.

Since gears are employed for the backward and forward drive switching and the change speed, this transmission assures a higher transmission efficiency than a disk type stepless transmission, for example.

The transmission gearing is disposed in a space laterally of the differential case, which space is often left unused. Thus the transmission structure of this invention does not require an increased space for its installation.

In this way, the present invention provides a compact transmission having a high transmission efficiency. This transmission is particularly suited for use in a lawn mower or other small machines as will be described hereinafter.

The foregoing and other objects, features and advantages of the invention will be apparent from the following more particular description of a preferred embodiment of the invention, as illustrated in the accompanying drawings.

BRIEF DESCRIPTION OF THE DRAWINGS

The drawings show a transmission according to the present invention, in which.

DESCRIPTION OF THE PREFERRED EMBODIMENT

Figure 9:
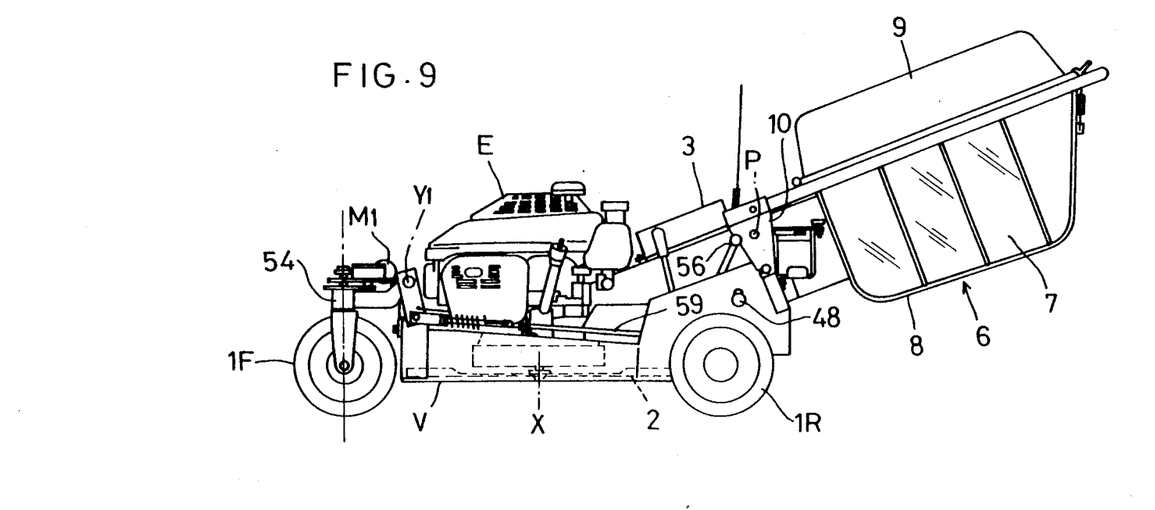
FIG. 9 is a side elevation of a lawn mower.
Figure 10:
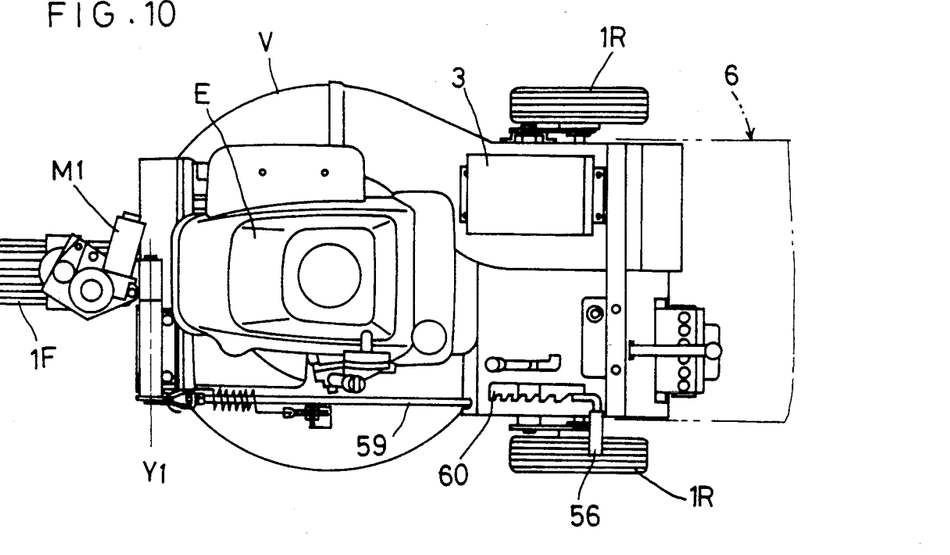
FIG. 10 is a plan view of the lawn mower.

Referring to FIGS. 9 and 10 first, a remote control lawn mower is shown, which comprises a vehicle body V having a single front wheel 1F steerable by a motor M1, and right and left rear drive wheels 1R. The vehicle body V carries a blade 2 rotatable on a vertical axis X for cutting grass, an engine E, and a receiver 3 for controlling the lawn mower in response to signals transmitted from a transmitter (not shown) operated by an operator. A grass catcher 6 is mounted rearwardly of the vehicle body V for collecting grass clippings.

Figure 13:
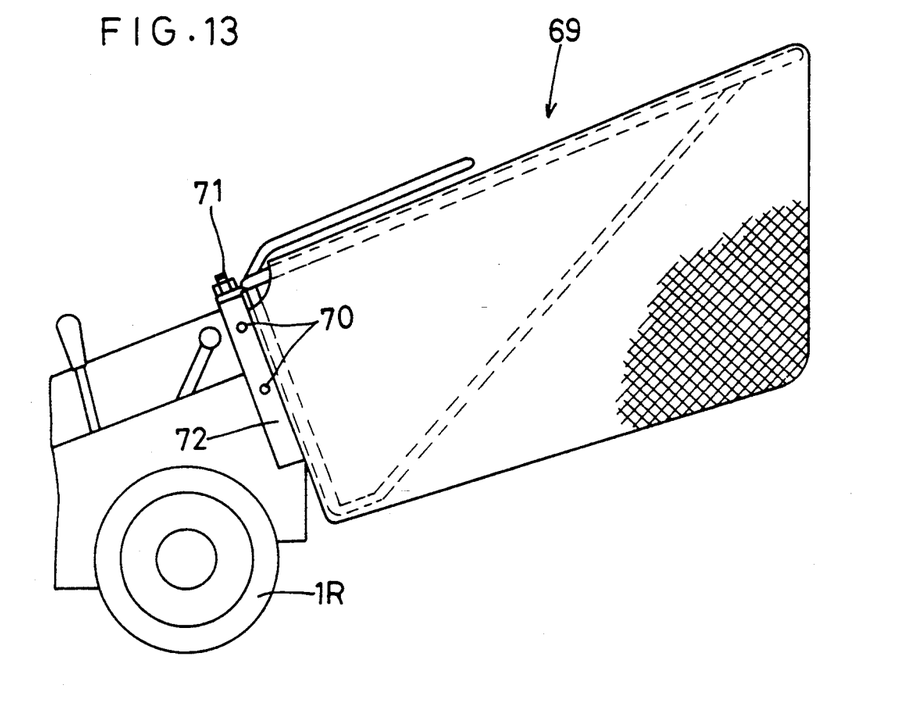
FIG. 13 is a partial side view of the lawn mower carrying a grass catcher bag.
Figure 14:
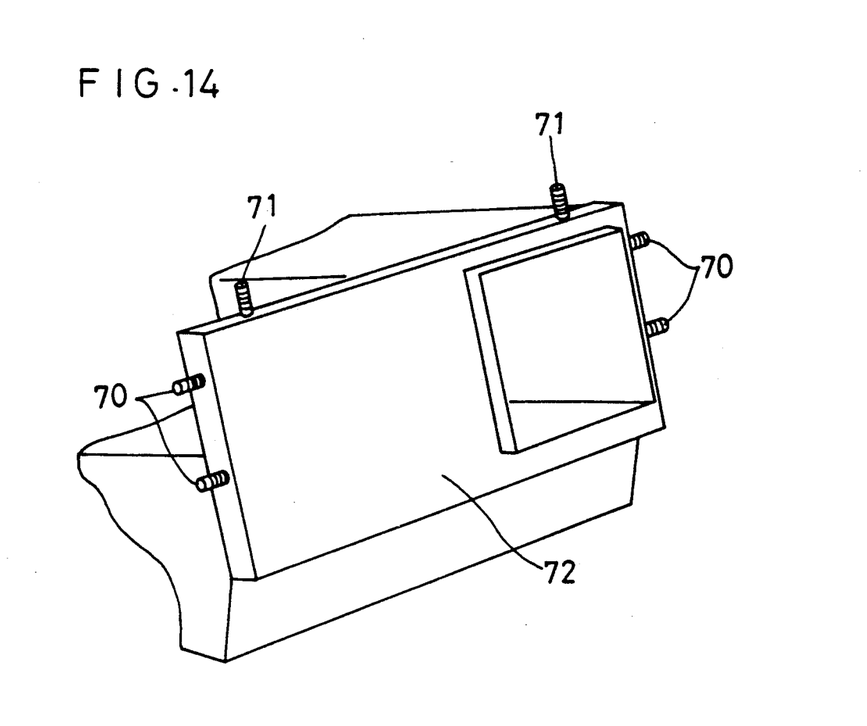
FIG. 14 is a perspective view of a grass catcher mounting bracket.

As shown in FIG. 14, a grass catcher mounting bracket 72 is disposed rearwardly of the vehicle body V for attaching thereto the grass catcher 6 including a catcher frame 8 containing vinyl bag 7 as shown in FIG. 9. Alternatively, a bag type grass catcher 69 may be attached to the bracket 72 as shown in FIG. 13. More particularly, the bracket 72 includes first studs 70 on lateral faces thereof for attaching the grass catcher 6 containing the vinyl bag 7, and second studs 71 on a top face thereof for attaching the grass catcher 69.

Figure 1:
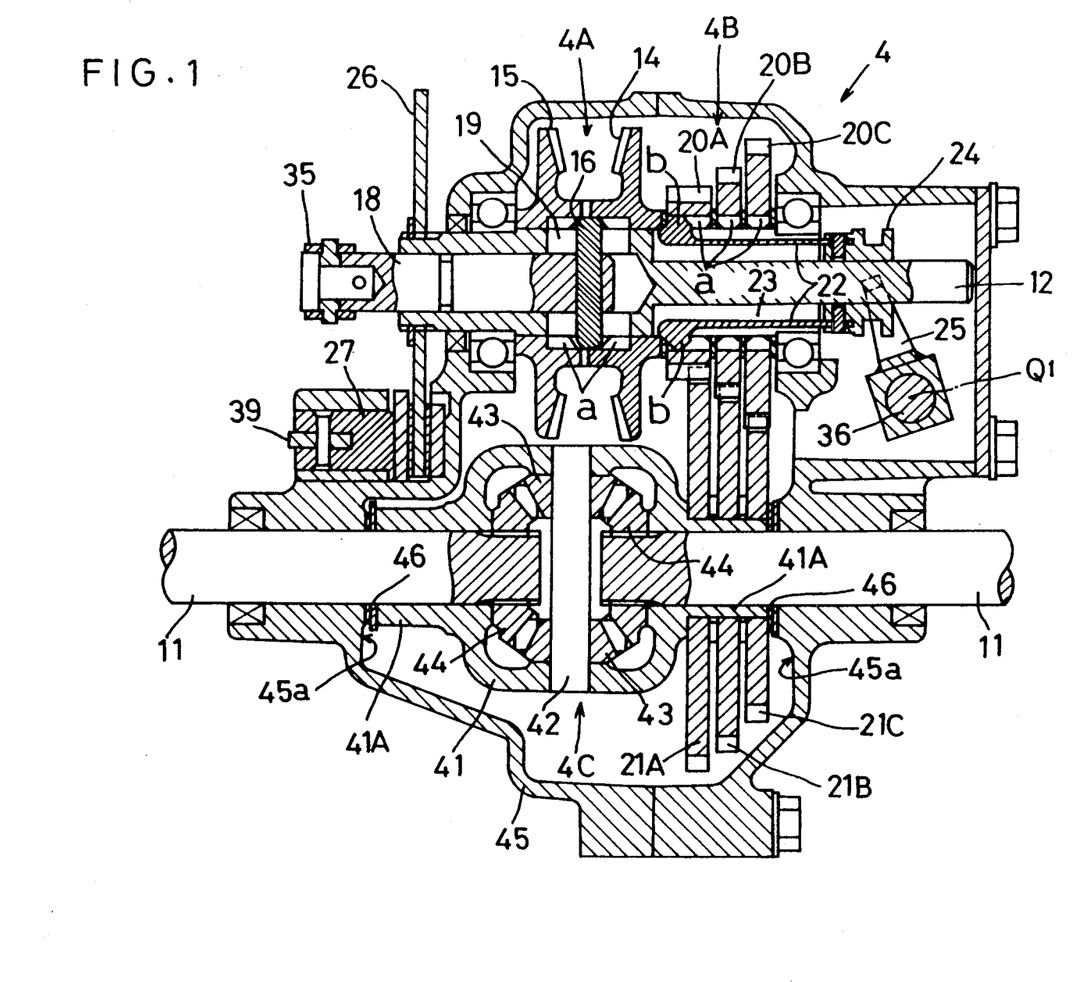
FIG. 1 is a view in vertical section of the transmission.

The right and left rear drive wheels 1R are driven by a transmission 4 as shown in FIG. 1. The transmission 4 includes a backward and forward drive switching device 4A for switching the rear wheels 1R to a forward drive state, a stopping state and a backward drive state, a gear type change speed device 4B for changing the output of the backward and forward drive switching device 4A into three, i.e. low, intermediate and high, speeds, and a differential 4C for receiving the output of the change speed device 4B and driving the right and left rear wheels 1R.

Figure 2:
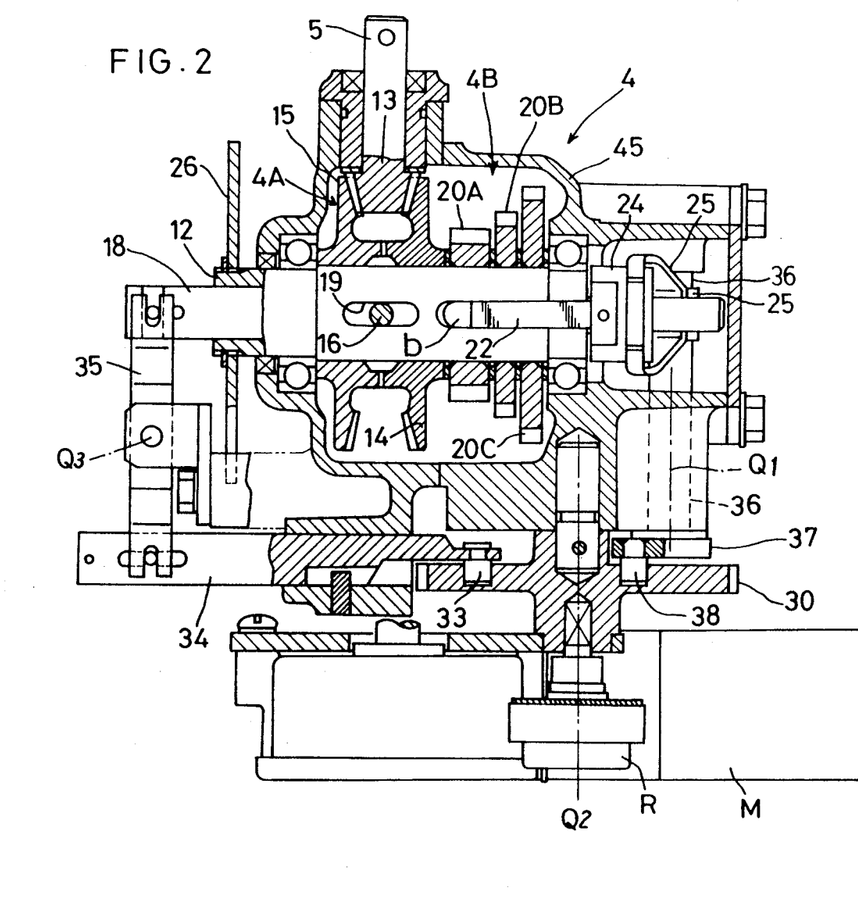
FIG. 2 is a transverse section taken on a horizontal plane of the transmission as viewed from the top.

Referring to FIGS. 1 and 2, the backward and forward drive switching device 4A includes a transmission shaft 12 rotatable on a transverse axis extending parallel to axles 11 of the right and left rear wheels 1R. A drive input shaft 5 operatively connected to the engine E carries an output bevel gear 13 fixed to an extreme end thereof. The transmission shaft 12 supports a forward drive input bevel gear 14 and a backward drive input bevel gear 15 mounted for rotation relative to the transmission shaft 12. The input bevel gears 14 and 15 are meshed with the output bevel gear 13 for rotation in opposite directions.

Figure 3:
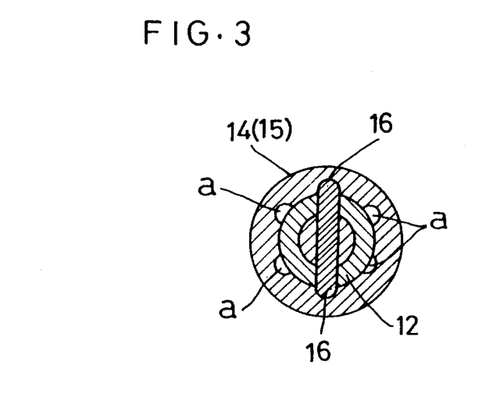
FIG. 3 is a section showing an engagement structure for effecting backward and forward drive switching.

As also shown in FIG. 3, each input bevel gear 14 or 15 includes a boss defining a plurality of engaging recesses a in an inside wall thereof which are arranged equidistantly in the circumferential direction of the transmission shaft 12. An engaging pin 16 is provided for engaging the recesses a (FIG. 3).

The pin 16 is attached to an extreme end of a backward and forward drive switching shift rod 18, and extends through the shift rod 18 in a direction perpendicular to its axis. The shift rod 18 is axially movably inserted into the transmission shaft 12. The pin 16 is received in slots 19 defined axially of the transmission shaft 12, whereby the shift rod 18 in the inserted position is rotatable with the transmission shaft 12.

Thus, by moving the shift rod 18 axially of the transmission shaft 12, the engaging pin 16 rotatable with the transmission shaft 12 engages the recesses a of one of the input bevel gears 14 or 15. As a result the transmission shaft 12 is driven forward or backward.

When the engaging pin 16 lies in a position between the input gears 14 and 15, the pin 16 is out of engagement with the recesses a of either input gear 14 or 15. In this position, the drive transmission from the engine E to the transmission shaft 12 is broken to stop the lawn mower.

A spring 17 is provided in the connection between a control arm 35 and a rod 34 as described later. This spring 17 remains ineffective until the pin 16 and engaging recesses a are in phase.

The change speed device 4B includes three output gears 20A, 20B and 20C having varied diameters arranged axially for rotation relative thereto. These output gears 20A, 20B and 20C are meshed with three input gears 21A, 21B and 21C fixed to a boss of a differential case 41 containing the differential 4C, respectively.

Figure 4:
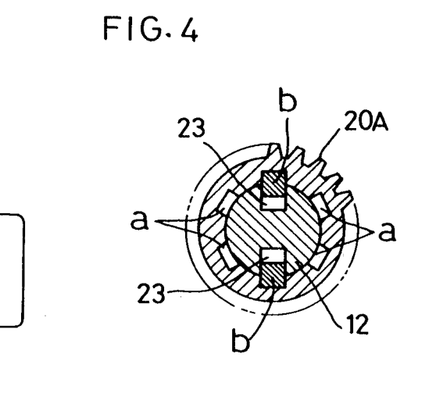
FIG. 4 is a section showing a change speed gear structure.

Each of the output gears 20A, 20B and 20C includes a boss contacting the transmission shaft 12. This boss defines a plurality of groove-like engaging recesses a arranged in an inside wall thereof circumferentially of the transmission shaft 12 (FIG. 4).

The transmission shaft 12 defines two axial grooves 23 in which leaf springs 22 are fitted to be movable therealong, respectively. Each leaf spring 22 defines a projection b at a distal end thereof. The projection b is urged to engage one of the engaging recesses a of the output gears 20A, 20B and 20C. Further, the transmission shaft 12 carries a shifter 24 mounted adjacent an end thereof to be movable axially of the transmission shaft 12. The leaf springs 22 are fixed at proximal ends thereof to this shifter 24.

The leaf springs 22 move axially along the grooves 23 defined peripherally of the transmission shaft 12 with the movement of the shifter 24 axially of the transmission shaft 12. As a result, the rotation of the transmission shaft 12 is transmitted to one of the output gears 20A, 20B and 20C.

The output gear 20A located the most inwardly is a low speed gear and has a broader boss than the other output gears 20B and 20C. As described later, this output gear 20A and transmission shaft 12 are engaged even when the backward and forward drive switching device 4A is switched to the stopping state.

In other words, the engagements at the backward and forward drive switching device 4A and change speed device 4B correspond to claw clutches.

Number 25 in FIG. 1 indicates a shift fork for operating the shifter 24. This shift fork 25 is pivotable on an axis Q1 perpendicular to the transmission shaft 12. Number 26 indicates a braking disk fixed to the transmission shaft 12. Number 27 indicates a piston movable into pressure contact with a brake disk relative to the braking disk 26 for applying brakes.

The differential 4C will be described next with reference to FIG. 1. The differential 4C includes two differential pinion gears 43 relatively rotatably mounted on a support shaft 42 extending centrally of the differential case 41. The pinion gears 43 are in constant mesh with right and left differential side gears 44 splined to the right and left axles 11. The differential case 41 includes elongated axle bearing bosses 41A extending transversely to inside walls of 45a of a transmission case 45. These bosses 41A are in close contact with the axles 11 over extended lengths, thereby allowing the differential case 41 to be supported only by the axles 11. Further, the axle bearing bosses 41A abut against the inside walls 45a of the transmission case 45 through thrust bearings 46, thereby preventing a tilt of the differential case 41.

A mechanism for operating the backward and forward drive switching device 4A and change speed device 4B will be described next.

As described later, the drive switching device 4A and change speed device 4B are simultaneously switchable by an electric change speed motor M acting as a single actuator.

Figure 5:
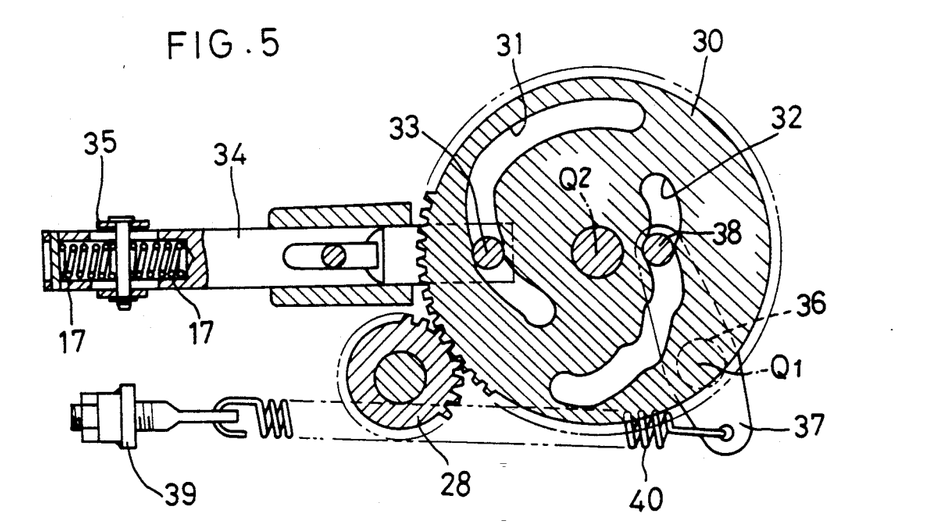
FIG. 5 is a view in vertical section of an interlocking structure for effecting the backward and forward drive switching, change speed and brake application.

Referring to FIGS. 2 and 5, the operating mechanism includes a drive gear 28 rotatable by the change speed motor M, and a cam gear 30 meshed with the drive gear 28. These gears 28 and 30 are rotatable backward and forward on transverse axes parallel to the pivotal axis Q1 of the change speed shift fork 25, respectively. The cam gear 30 defines a slot 31 acting as a backward and forward drive switching cam, and a slot 32 acting as a change speed cam.

The slot 31 receives a pin 33 attached to one end of the rod 34 mentioned hereinbefore. The rod 34 is operatively connected at the other end thereof to one end of the backward and forward drive switching control arm 35 for moving the shift rod 18 axially of the transmission shaft 12. The control arm 35 is pivotably supported at an intermediate position thereof on a vertical axis Q3 perpendicular to the axis of transmission shaft 12.

The rod 34 reciprocates axially of the transmission shaft 12 with backward and forward rotations of the cam gear 30 on its axis Q2. This reciprocation causes the control arm 35 to pivot on the vertical axis Q3, thereby moving the shift rod relative to the transmission shaft 12 to effect the backward and forward drive switching.

On the other hand, the shift fork 25 is operable by a control shaft 36 carrying a control arm 37 fixed to one end thereof for rotating the control shaft 36. The control arm 37 carries a pin 38 that engages the change speed slot 32 defined in the cam gear 30. As shown in FIG. 1, the control shaft 36 is fitted into the shift fork 25 to be movable in unison. The shift fork 25 moves in a transverse direction by pivotal movement of the control shaft 36 about the axis Q1. Seen from FIGS. 1 and 2, free ends of the shift fork 25 engage recesses defined in the shifter 24 slidable on the transmission shaft 12 by the transverse oscillation.

The control arm 37 pivots when the cam gear 30 is rotated backward or forward from a rest position. As a result, the leaf springs 22 attached to the shifter 24 move between the low speed output gear 20A and high speed output gear 20C, thereby effecting the change speed.

The slot 32 receiving the pin 38 attached to the control arm 37 is vertically symmetric about the illustrated rest position. Consequently, the control arm 37 is pivotable in the same direction whether the cam gear 30 is rotated forward or backward.

The change speed device 4B is switched from low speed to high speed when the cam gear 30 is rotated forward to operate the backward and forward drive switching device 4A from the rest position to the forward drive position. Conversely, the change speed device 4B is switched from a rest position to low speed when the cam gear 30 is rotated backward to operate the drive switching device 4A from the rest position to the backward drive position. Thus, the transmission 4 enables the backward and forward drive switching and provides three forward speeds and three backward speed. The cam gear 30 acts as a control member for switching the backward and forward drive switching device 4A and change speed device 4B.

Reference R in FIG. 2 indicates a potentiometer acting as means for detecting operative positions of the backward and forward drive switching device 4A and change speed device 4B, namely control positions of the cam gear 30. The potentiometer R is rotatable on an axis aligned with the rotational axis Q2 of the cam gear 30.

A brake operating mechanism will be described next.

Figures 6, 7:
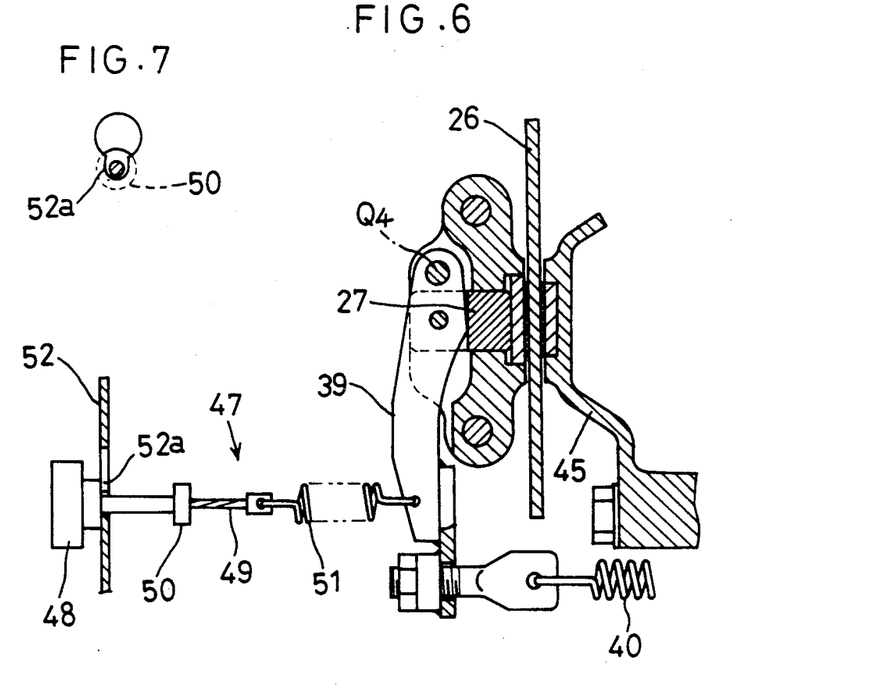
FIG. 6 is a plan view of a braking structure.
FIG. 7 is a side view of a catch for engaging a brake releasing device.

Referring to FIGS. 5 and 6, the piston 27 is pressed against the brake pad adjacent disk 26 by a brake arm 39 pivotably supported at one one thereof on a vertical axis Q4. The other end of brake arm 39 is operatively connected through a spring 40 to the other end of the change speed control arm 37.

The control arm 37 is pivotable clockwise from the rest position to the high speed position whether the mower is driven forward or backward. Thus, the other end of the control arm 37 to which the spring 40 is connected is movable in a direction to relax the spring 40. When the transmission 4 is switched from the rest state to the forward or backward drive state, the piston 27 is automatically switched from a braking position to a brake releasing position.

When the change speed control arm 37 pivots to the rest position, the tensile force of spring 40 presses the piston 27 against the brake disk 26 to apply the brakes.

More particularly, the rear wheels 1R are automatically braked since, in the rest state, the low speed output gear 20A of the change speed device 4B is maintained in engagement with the transmission shaft 12 to which the brake disk 26 is fixed because the width of the teeth for low drive is twice as wide as the low drive gear, as shown in FIG. 1.

In this way, the brake control is interlocked with the switching from the stopping state to the forward or backward drive state.

As shown in FIG. 6, this braking mechanism is the negative type. It may be desirable to move the vehicle body V without operating the engine E in the event of gasoline run-out or remote control trouble. A brake releasing device 47 is provided for enabling the operator to push the vehicle body V on such an occasion. The brake releasing device 47 includes a pull knob 48, a wire 49 connected to the knob 48, an engaging piece 50 fixed to an intermediate position of the wire 49, and a tension spring 51 connecting the wire 49 to the brake arm 39. The brakes are released by engaging the engaging piece 50 with a catch bore 52a, as shown in FIG. 7, which is defined in a side plate of the vehicle body V.

Figure 8:
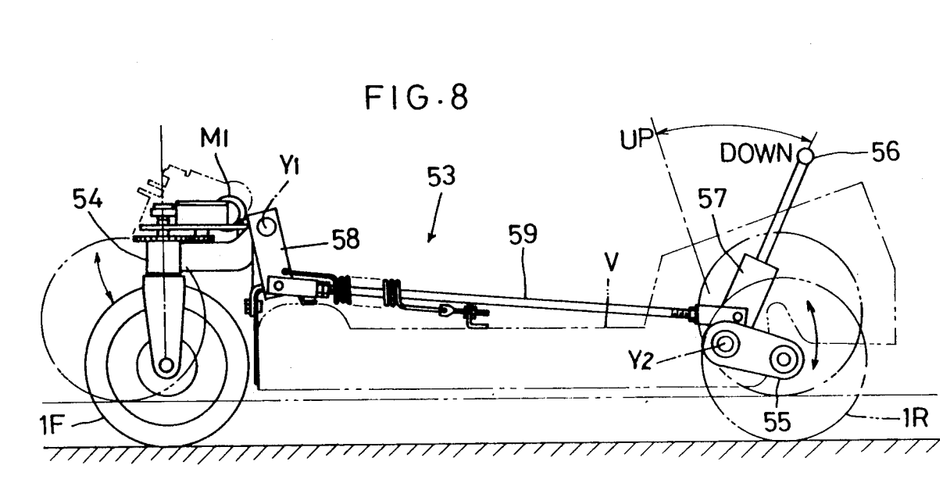
FIG. 8 is a side view of a mechanism for adjusting a grass cutting height.
Figure 11:
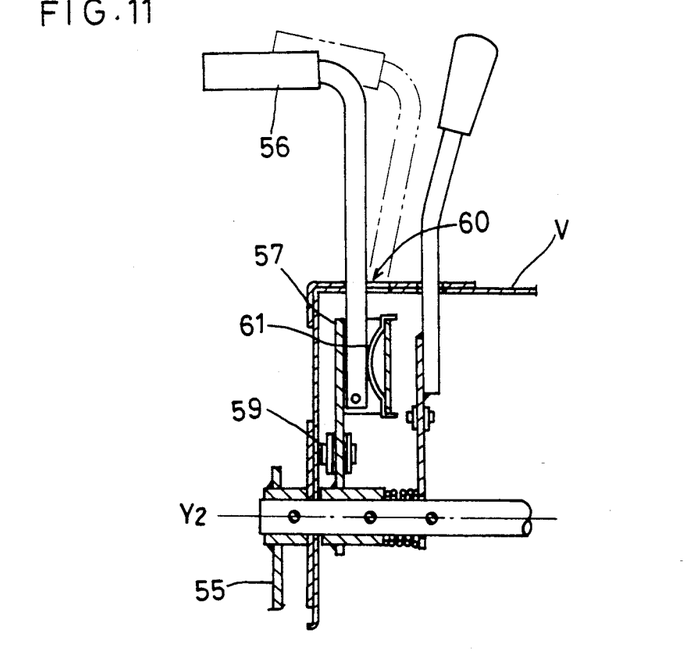
FIG. 11 is a rear view of a cutting height adjusting lever.

A grass cutting height adjusting mechanism 53 will be described next. As shown in FIG. 8, the front wheel 1F is connected to the vehicle body V to be vertically pivotable on a transverse axis Y1 integrally with a frame 54 supporting the steering motor M1. The right and left rear wheels 1R are connected to the vehicle body V to be vertically pivotable, through a pivotable arm 55, on a transverse axis Y2 integrally with the transmission case 45. The front and rear wheels 1F and 1R are pivotable together by operating a cutting height adjusting lever 56 attached to the transverse axis Y2. More particularly, the movement of the adjusting lever 56 is transmitted to the front wheel 1F through a connecting rod 59 extending from a base holder 57 to which the control lever 56 is attached, to an interlocking frame 58 on the transverse axis Y1. As shown in FIG. 11, the adjusting lever 56 has a guide 60 defining a plurality of engaging grooves arranged in a pivoting direction of the adjusting lever 56. The base holder 57 includes a leaf spring 61 for pushing the adjusting lever 56 into a selected engaging groove, thereby setting a grass cutting height.

Figure 12:
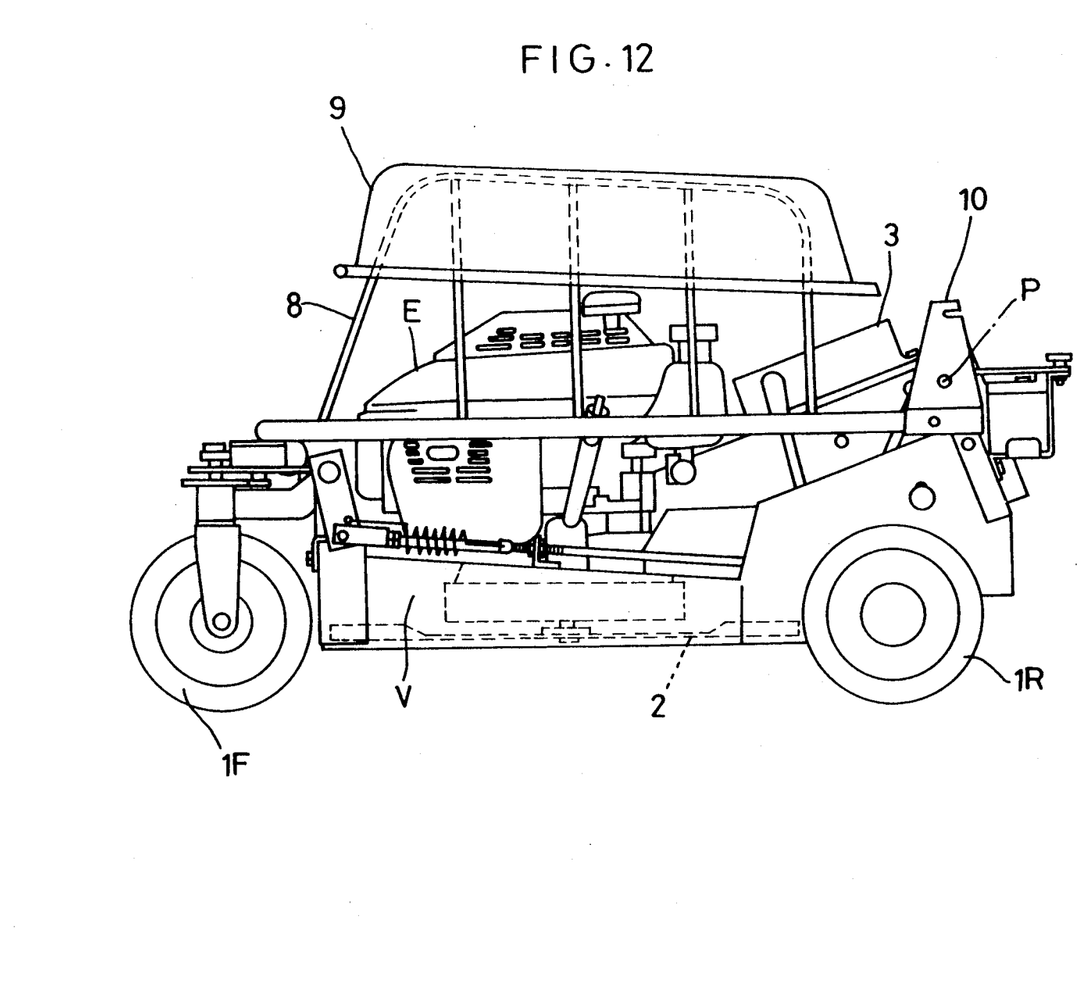
FIG. 12 is a side elevation of the lawn mower in a state for storage.

The construction of the grass catcher 6 will be described next. As shown in FIGS. 9 and 12, the grass catcher 6 includes the catcher frame 8 for accommodating a vinyl bag 7, and a cover 8 for closing the catcher frame 8. The catcher frame 8 is pivotable on a transverse pivot P provided by a bracket 10 on the vehicle body V, to a contained position overlying the engine E and vehicle body V. The cover 9 may advantageously be placed on the catcher frame 8 in this position. The lawn mower in this state is convenient for storage in distribution stages.

The foregoing embodiment has been described in relation to a lawn mower. However, the present invention is applicable to other types of agricultural machinery and to ordinary vehicles.

The backward and forward drive switching device 4A may also be used for reversibly driving a grass cutting unit or other working implements.

What is claimed is:
1. A transmission comprising;
    a transmission case,
    a change speed mechanism housed in said transmission case, and
    a differential mechanism for transmitting drive from said change speed mechanism to ground wheels, said differential mechanism including;
        an input section for receiving the drive from said change speed mechanism, said input section including a differential case,
        differential gear means for receiving the drive from said input section, and
        an output section for outputting the drive to said ground wheels, said output section including axles journaled in axially extending first bearing bosses defined by said transmission case with said axle supported by and rotatable within said first bearing bosses, a bearing outwardly of said first bearing bosses in said transmission case,
    wherein said differential case has elongated second bearing bosses (41A) extending axially juxtaposed to inside walls of said first bearing bosses defined by said transmission case, and said differential case is supported exclusively by the axles extending through the first bearing bosses and the elongated second bearing bosses.

2. A transmission as claimed in claim 1, wherein one of said elongate second bearing bosses carries a plurality of gears mounted for rotation with said differential case to provide a plurality of speeds.

3. A transmission comprising;
    a transmission case,
    a change speed mechanism housed in said transmission case and including;
        a transmission shaft driven by a drive input shaft, said transmission shaft being connected to said drive input shaft through a pair of forward drive and backward drive input bevel gears to be selectively driven in opposite directions, and
    said change speed mechanism includes a transmission gearing for transmitting drive to right and left axles extending parallel to said transmission shaft, said transmission gearing including a plurality of drive gears supported by said transmission shaft in parallel to said input bevel gears, and a plurality of driven gears meshed with said drive gears, and
    a differential mechanism for transmitting the drive from said change speed mechanism to driven ground wheels, said differential mechanism including;
        an input section for receiving the drive from said change speed mechanism, said input section including a differential case,
        differential gear means for receiving the drive from said input section, and
        an output section for outputting the drive to said driven ground wheels, said output section including said left and right axles, each of said left and right axles are journaled in axially extending first bearing bosses defined by said transmission case with said left and right axles supported by and rotatable within said first bearing bosses, a roller bearing outwardly of said bearing bosses in said transmission case,
    wherein said driven gears are relatively rotatably supported by one of said axles through elongated second bosses on said differential case adn said differential case is exclusively supported by an end of each of said left and right axles.

4. A transmission as claimed in claim 3, wherein said transmission gearing provides, low, intermediate and high speeds.

5. A transmission as claimed in claim 4, wherein each of said input bevel gears includes a plurality of engaging recesses in an inside wall thereof to be engageable by an engaging pin attached to an extreme end of a shift rod and extending through said shift rod in a direction perpendicular to an axis of said shift rod, said shift rod being axially movably inserted into said transmission shaft, said transmission shaft being reversibly rotatable by moving said shift rod axially of said transmission shaft.

6. A transmission as claimed in claim 4, wherein each of said drive gears includes a boss contacting said transmission shaft and defining a plurality of groovelike engaging recesses arranged in an inside wall thereof circumferentially of said transmission shaft, said engaging recesses being selectively engageable by engaging projections defined on shiftable leaf springs, thereby transmitting rotation of said transmission shaft to one of said drive gears.

7. A transmission comprising;
a transmission case,
a change speed mechanism housed in said transmission case and including transmission gearing for providing a plurality of speeds, and
a differential mechanism for transmitting drive from said change speed mechanism to driven ground wheels, said differential mechanism including;
an input section for receiving the drive from said change speed mechanism, said input section including a differential case,
differential gear means for receiving the drive from said input section, and
an output section for outputting the drive to said driven ground wheels, said output section including axles journaled in axially extending first bearing bosses defined by said transmission case with said axles supported by and rotatable within said first bearing bosses, a bearing outwardly of said first bearing bosses in said transmission case,
wherein said differential case has elongated second bearing bosses extending axially juxtaposed to inside walls of said first bearing bosses defined by said transmission case and said differential case is supported exclusively by one end of said axles, said elongated second bearing bosses including a plurality of input gears mounted on one of said elongated second bearing bosses to be rotatable with said differential case.

8. A differential mechanism for use with a small transmission including driven ground wheels, comprising;
an input section for receiving drive and including a differential case,
differential gear means for receiving the drive from said input section, and
an output section for outputting the drive to said driven ground wheels, said output section including axles journaled in axially extending first bearing bosses defined by a transmission case with said axles supported by and rotatable within said first bearing bosses, a bearing outwardly of said first bearing bosses in said transmission case,
wherein said differential case has elongated second bearing bosses extending axially juxtaposed to inside walls of said first bearing bosses defined by said transmission case, and is supported exclusively by said axles through said elongated second bearing bosses.

9. A transmission comprising:
a transmission case,
a change speed mechanixm housed in said transmission case and including;
a transmission shaft driven by a drive input shaft, said transmission shaft being connected to said drive input shaft through a pair of forward drive and backward drive input bevel gears to be selectively driven in opposite directions, and
said change speed mechanism includes a transmission gearing for transmitting low, intermediate and high drive speeds to right and left axles extending parallel to said transmission shaft, said transmission gearing including a plurality of drive gears supported by said transmission shaft in parallel to said input bevel gears, and a plurality of driven gears meshed with said drive gears, and
a differential mechanism for transmitting the drive from said change speed mechanism to driven ground wheels, said differential mechanism including;
an input section for receiving the drive from said change speed mechanism, said input section including a differential case,
differential gear means for receiving the drive from said input section, and
an output section for outputting the drive to said driven ground wheels, said output section including said left and right axles which are journaled in first bosses defined by said transmission case,
wherein said driven gears are relatively rotatably supported by one of said axles through elongated second bosses on said differential case, and said forward drive and backward drive input bevel gears and said transmission gearing are selectively switchable by an electric change speed motor acting as a single actuator.

* * * * *